(12) United States Patent
Meng et al.

(10) Patent No.: US 9,153,026 B2
(45) Date of Patent: Oct. 6, 2015

(54) CALIBRATION OF PLENOPTIC IMAGING SYSTEMS

(71) Applicants: Lingfei Meng, Redwood City, CA (US); Kathrin Berkner, Los Altos, CA (US); Sapna A. Shroff, Menlo Park, CA (US)

(72) Inventors: Lingfei Meng, Redwood City, CA (US); Kathrin Berkner, Los Altos, CA (US); Sapna A. Shroff, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 135 days.

(21) Appl. No.: 13/685,279

(22) Filed: Nov. 26, 2012

(65) Prior Publication Data

US 2014/0146184 A1    May 29, 2014

(51) Int. Cl.
H04N 5/225    (2006.01)
G06T 7/00    (2006.01)
H04N 17/00    (2006.01)

(52) U.S. Cl.
CPC ............ *G06T 7/0018* (2013.01); *H04N 17/002* (2013.01); *G06T 2207/10052* (2013.01); *H04N 5/2254* (2013.01)

(58) Field of Classification Search
CPC .......................... G06T 7/0018; H04N 13/0282
USPC .................................................. 348/265, 340
See application file for complete search history.

(56) References Cited

U.S. PATENT DOCUMENTS

| | | | |
|---|---|---|---|
| 8,289,440 B2 | 10/2012 | Knight et al. | |
| 8,681,249 B2* | 3/2014 | Kobayashi et al. | 348/246 |
| 8,749,694 B2* | 6/2014 | Georgiev et al. | 348/345 |
| 2010/0265385 A1 | 10/2010 | Knight et al. | |
| 2011/0169994 A1* | 7/2011 | DiFrancesco et al. | 348/340 |
| 2013/0127901 A1* | 5/2013 | Georgiev et al. | 345/620 |

OTHER PUBLICATIONS

Ostu, N., "A Threshold Selection Method from Gray-Level Histogram," IEEE Transactions on Systems, Man and Cybernetics, 1979, pp. 62-66, vol. 9, No. 1.
"RxLive User Guide," Ratrix GmbH, Oct. 2011, 49 pages.
Rodríguez-Ramos, J. et al., "3d Imaging and Wavefront Sensing with a Plenoptic Objective," in Proceedings of SPIE, 2011, 80430R, 11 pages, vol. 8043.
U.S. Appl. No. 61/170,620, "Light Field Data Acquisition Devices, and Methods of Using and Manufacturing," Inventors: T. Knight et al., filed Apr. 18, 2009.

* cited by examiner

*Primary Examiner* — Gary C Vieaux
(74) *Attorney, Agent, or Firm* — Fenwick & West LLP

(57) ABSTRACT

Calibration for plenoptic imaging systems. The calibration preferably is performed automatically by a processor. In one approach, the processor accesses a plenoptic image captured by the plenoptic imaging system. The plenoptic image is analyzed to determine reference points for superpixels of the plenoptic imaging system, for example the centers of the superpixels. The reference points are used to determine a location of each superpixel relative to the detector array.

70 Claims, 12 Drawing Sheets

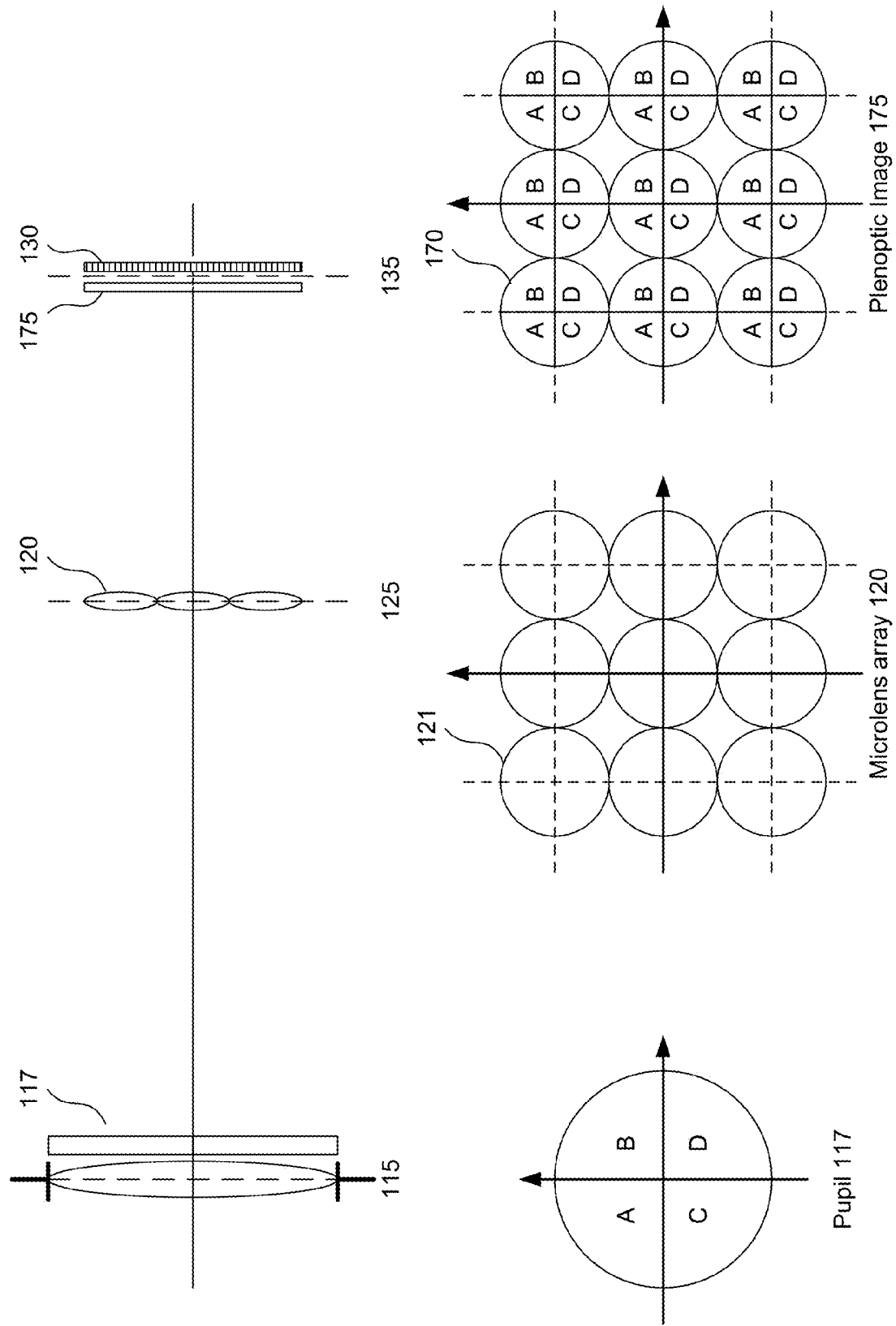

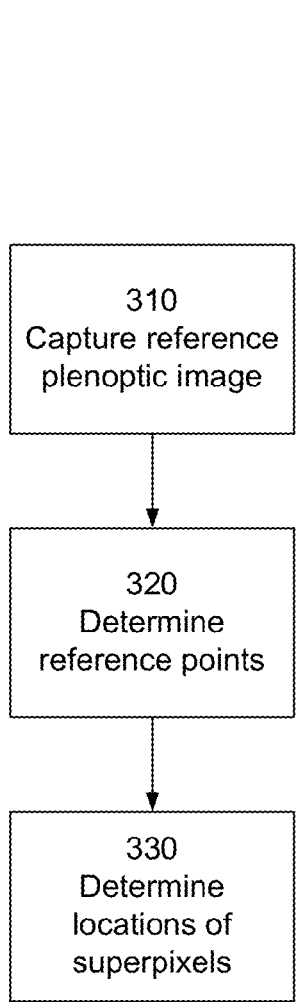
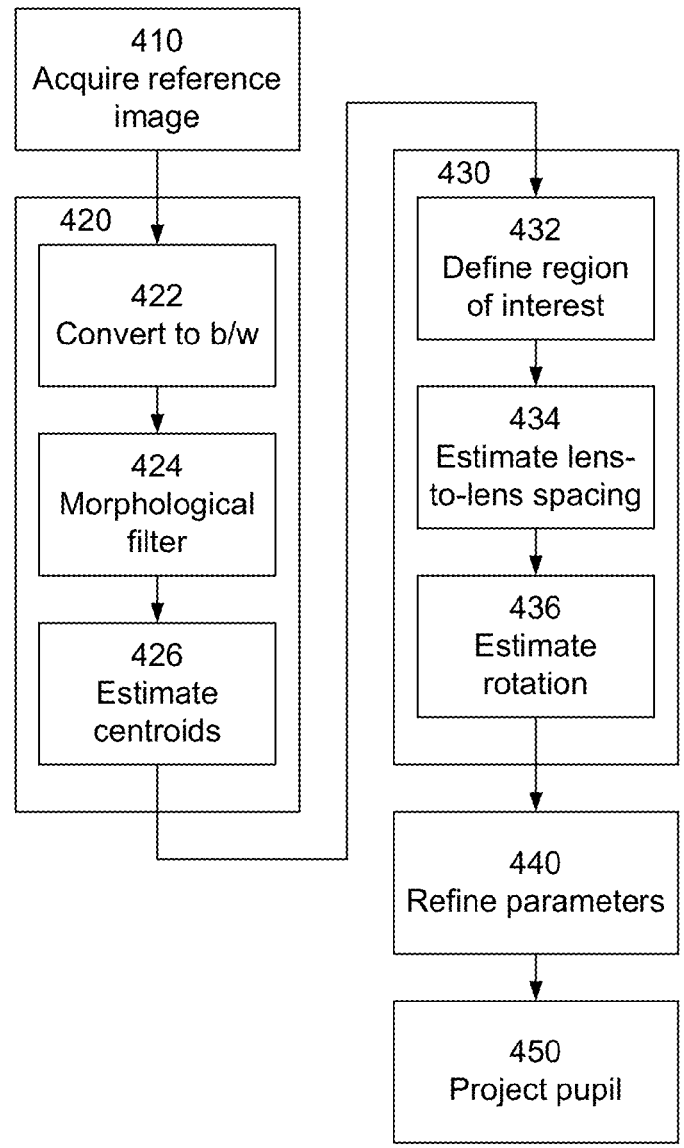
FIG. 3
FIG. 4

CALIBRATION OF PLENOPTIC IMAGING SYSTEMS

BACKGROUND OF THE INVENTION

1. Field of the Invention

This invention relates generally to plenoptic imaging systems and, more particularly, to the calibration of plenoptic imaging systems.

2. Description of the Related Art

The plenoptic imaging system has recently received increased attention. It can be used to recalculate a different focus point or point of view of an object, based on digital processing of the captured plenoptic image. The plenoptic imaging system also finds application in multi-modal imaging, using a multi-modal filter array in the pupil plane of the primary imaging module. Each filter is imaged at the sensor, effectively producing a multiplexed image of the object for each imaging modality of the filter array. Other applications for plenoptic imaging systems include varying depth of field imaging and high dynamic range imaging.

However, the architecture of a plenoptic imaging system is different from that of a conventional imaging system, and therefore requires different calibration and processing procedures. Several challenges are found in the processing of plenoptic images. First, the alignment of the microlens array is never perfect and the effect of rotation of the microlens array is quite observable. This rotation introduces a large amount of difficulties for image reconstruction because the data points do not fall onto a regular sampling grid. Second, for a modular system architecture, different detector arrays and microlens arrays could be used based on different applications. Manual determination of parameters, such as center of lenslet, pixels under each lenslet, etc., is difficult and time consuming. Third, for different applications, different objective lenses could be used. The parameters necessary for image reconstruction are different when the plenoptic image data are taken with different objective lenses or at different focal settings.

Thus, there is a need for calibration techniques for plenoptic imaging systems.

SUMMARY OF THE INVENTION

The present invention overcomes the limitations of the prior art by providing calibration for plenoptic imaging systems. The calibration preferably is performed automatically by a processor. In one approach, the processor accesses a plenoptic image captured by the detector array of the plenoptic imaging system, preferably in response to a reference object. The plenoptic image is analyzed to determine reference points for superpixels of the plenoptic imaging system, for example to determine the centers of the superpixels. The reference points are then used to determine a location of each superpixel relative to the detector array.

Other aspects of the invention include devices and systems corresponding to the methods described above, and applications for the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 2A is a diagram illustrating plenoptic imaging with perfectly aligned components.

FIG. 3 is a flow diagram of one method for calibrating a plenoptic imaging system.

FIG. 4 is a flow diagram of another method for calibrating a plenoptic imaging system.

Figure 1A:
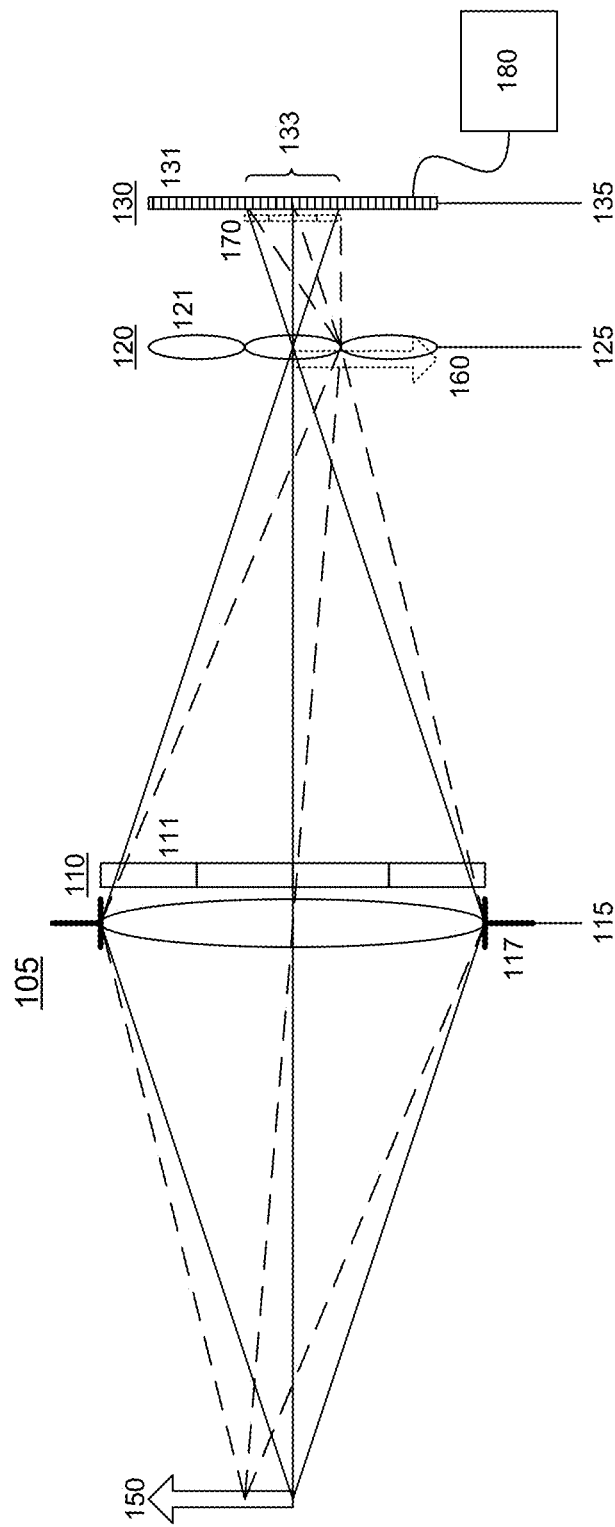
FIG. 1A is a diagram of a plenoptic imaging system according to the invention.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

FIGS. 1A-1D are diagrams of a plenoptic imaging system according to the invention. The system captures a plenoptic image of an object 150. The plenoptic imaging system includes an image-forming optical module 105, which in FIG. 1 is represented by a single lens element although it is understood that the optical module 105 could contain multiple elements and/or non-lens elements (e.g., mirrors). The optical module 105 forms a conventional optical image 160 of object 150. The optical module 105 may also be referred to as the primary imaging module, subsystem or system. The optical image 160 is formed at an image plane 125 of the optical module 105. The optical module 105 is characterized by a pupil 117 and pupil plane 115, which in FIG. 1 is represented by a physical aperture stop co-located with the single lens element. In more complex optical modules 105, the pupil 117 and pupil plane 115 need not be co-located with any of the optical elements within the optical module.

In a conventional imaging system, a detector array would be located at image plane 125 to capture the optical image 160. However, this is not the case for the plenoptic imaging system in FIG. 1. In this particular example, a filter module 110 is also positioned at the pupil plane 115 (or at one of its conjugates). This filter module is non-homogeneous in that its filtering characteristics change as a function of location. In the following example, the filter module 110 is a filter array that includes different filters 111. For example, the filters 111 may have different wavelength responses, different polarization responses, or different luminance responses. However, the filter module is not required to be a filter array. It could be a filter with a continuously varying response, for example. A filter array is used in this example for purposes of illustration. It should also be understood that the filter module is optional.

Second, an array 120 of micro-imaging elements 121 is located at the image plane 125. In FIG. 1, the micro-imaging elements 121 are shown as microlenses. Other elements can also be used, for example, an array of pinholes. The detector array 130 is located behind (i.e., optically downstream of) the micro-imaging array 120. More specifically, the detector array 130 is positioned in a conjugate plane 135 to the pupil plane 115. That is, each micro-imaging element 121 creates an image of the pupil plane 115 at the conjugate plane 135, which image is captured by the detector array 130.

In the case of microlenses, each microlens 121 forms an image 170 of the pupil (including the filter module) at the detector plane 135. The image of the pupil is captured by a subset of detectors 131 in the detector array 130. Each microlens 121 forms its own image 170. Thus, the overall plenoptic image formed at detector plane 135 will include an array of images 170, one for each microlens 121. This arrayed imaging effectively subdivides the detector array into superpixels 133, each of which contains multiple detectors 131. Each microlens 121 images the pupil onto the corresponding superpixel 133, with each pupil image then captured by detectors in the corresponding superpixel.

Figure 1B:
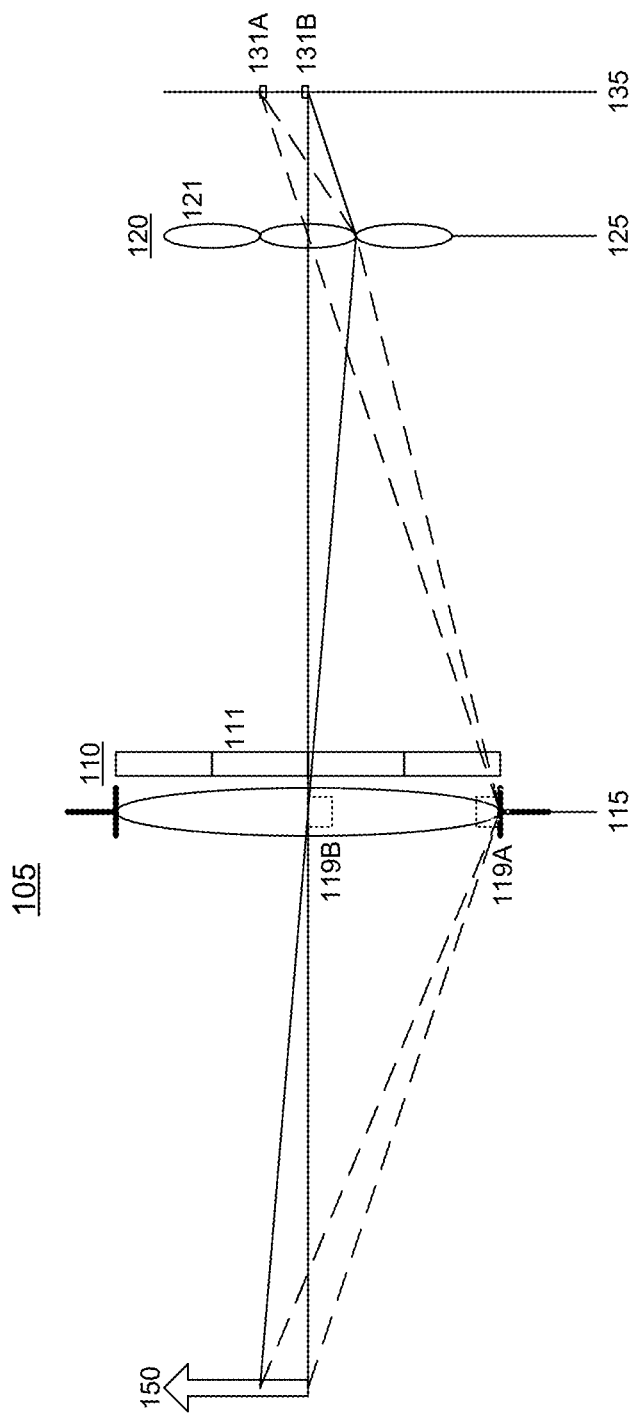
FIG. 1B illustrates the projection of a detector onto the pupil plane.

Conversely, referring to FIG. 1B, each individual detector 131 can be projected through a microlens 121 to a corresponding location 119 in the pupil plane 115 and on the filter module 110. For that specific detector 131, the microlens 121 collects light from the corresponding location 119. FIG. 1B shows the projection of detector 131A through the center microlens to location 119A, and the projection of detector 131B to location 119B. The projection 119 of the detector preferably is magnified by at least 10× relative to the actual detector size 131.

Figure 1C:
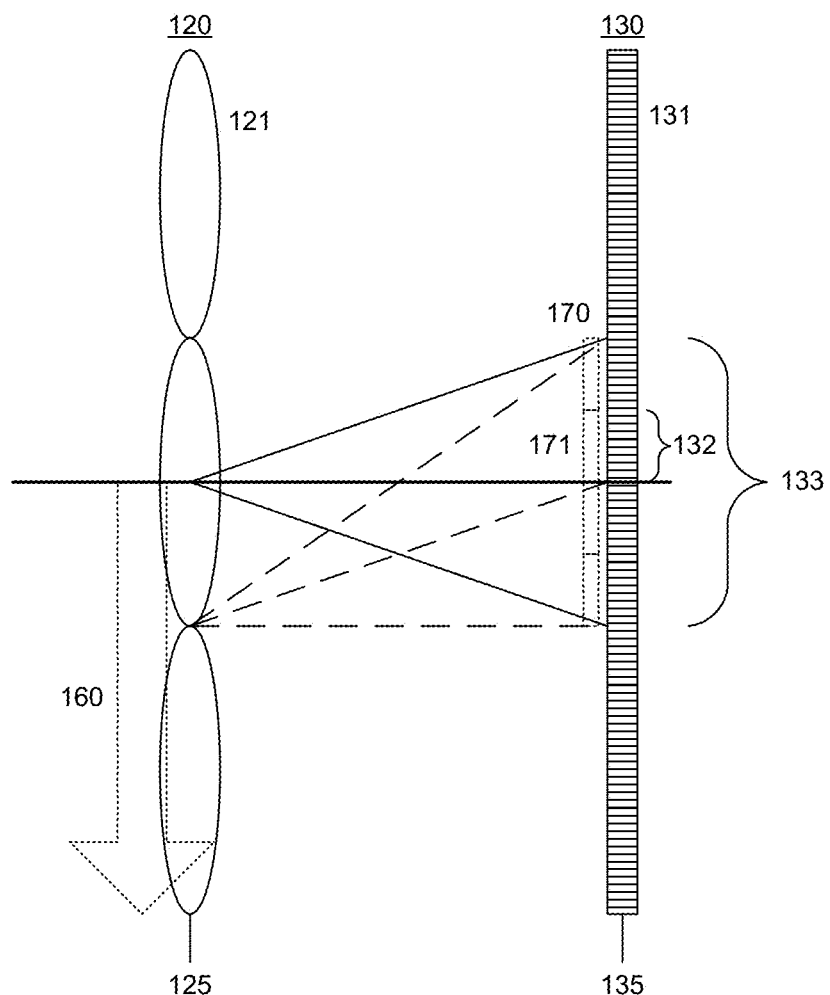
FIG. 1C is a detail of FIG. 1A.

Referring to FIG. 1C for more detail, each microlens 121 images the filter array 110 (that falls within the pupil) onto a superpixel 133. Each filter 111 covers only a portion of the filter array 110, so the image 171 of each filter 111 will cover only a portion of the superpixel 133. That portion will be referred to as a subpixel 132, as shown in the detail of FIG. 1C. That is, each microlens 121 directs light from a filter 111 to a corresponding subpixel 132. Each subpixel 132 may contain one or more detectors.

Each detector 131 collects the light from one filter 111 that travels through one microlens 121. The microlens array 120 is located in a conjugate plane to the object 150, so there is also an imaging relationship between the object 150 and the microlens array 120. Therefore, the light incident on a microlens is light originating from a portion of the object, not from the entire object. Thus, each detector 131 collects the light from a corresponding portion of the object (as determined by the extent of the microlens), as filtered by a corresponding filter 111.

Figure 1D:
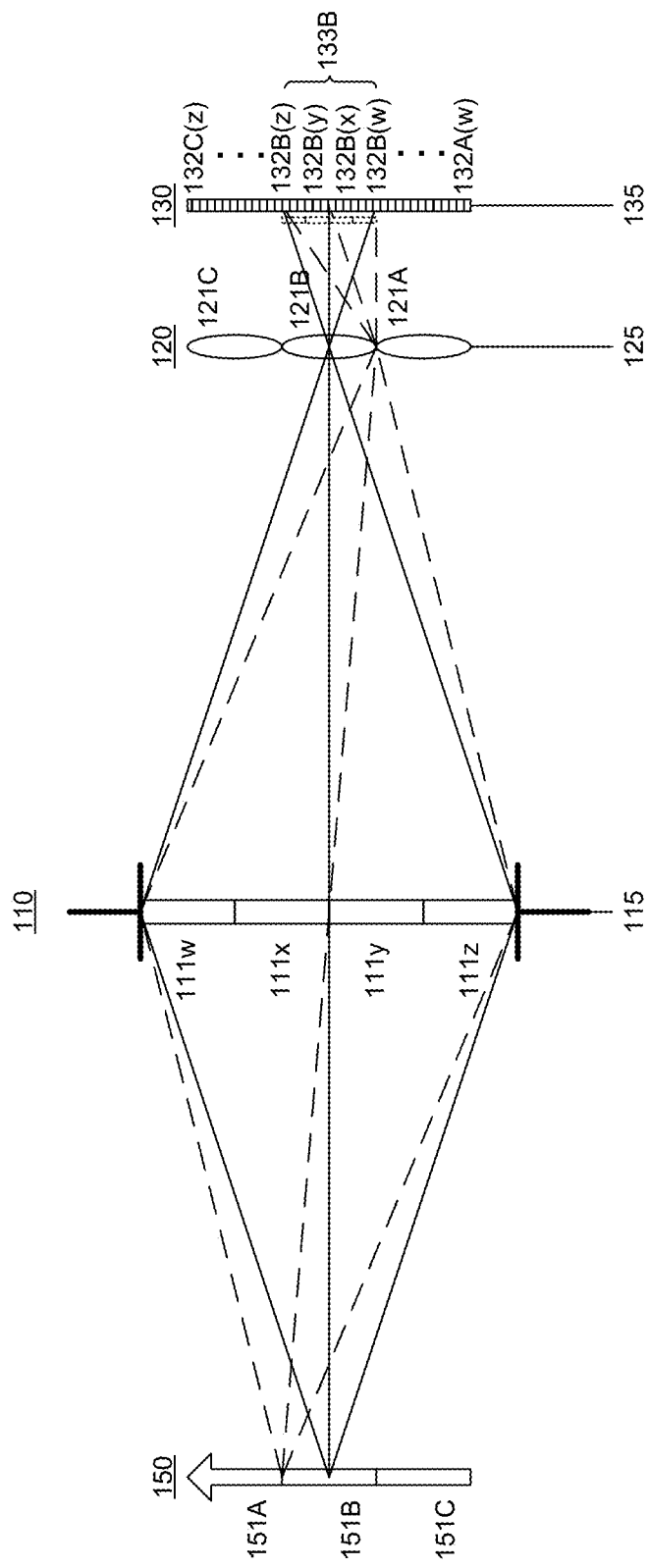
FIG. 1D is a diagram further illustrating the operation of the system of FIG. 1A.

FIG. 1D illustrates this concept in more detail. For clarity, the main lens 105 is omitted. In this example, the object 150 is divided into three subobjects 151A,B,C. Similarly, the illuminated portion of the filter array 110 includes four filters 111w,x,y,z. The object 150 is imaged onto the microlens array 120. More specifically, the subobject 151B is imaged onto microlens 121B. This means that every ray that leaves subobject 151B will travel through the pupil (and through different filters 111, depending on where in the pupil) and arrive at microlens 121B. Similarly, subobject 151A is imaged onto microlens 121A, and subobject 151C is imaged onto microlens 121C.

In addition, microlens 121B will image the entire filter array 110 (at least the portion that falls within the pupil) onto subarray 133B. Thus, filter 111w will be imaged by microlens 121B onto subpixel 132B(w), filter 111x onto subpixel 132B (x), and so on for the other filter/subpixel pairs, and for the other microlenses 121. For detectors 131 that fall entirely within subpixel 132B(w), those detectors will detect the light coming from subobject 151B passing through filter 111w. The same is true for the other subpixels 132A(w)-132C(z).

The imaging system is a "lightfield" imaging system because the rays collected by a detector are a function of not only their position in the object plane (as is the case in conventional imaging systems), but also a function of their position in the pupil plane.

Referring again to FIG. 1A, a processor 180 collects the data from the detector array 130 and processes it accordingly. As a simple example, the digital processing unit 180 may reorder the data, collecting together the data from subpixels 132A(w), 132B(w) and 132C(w) in order to form an image of the entire object, as filtered by filter 111w. The same can be done for filters 111x,y,z. Other types of processing can also be performed, since the captured lightfield includes information with respect to both the pupil plane and the object.

However, processing of the plenoptic image is sensitive to misalignments between the pupil 117 (including filter module 110), micro-imaging array 120, and detector array 130. In the previous example, in order to process subpixels 132A(w), 132B(w) and 132C(w), it should be known which individual detectors correspond to subpixels 132A(w), to 132B(w) and to 132C(w).

Figure 2B:
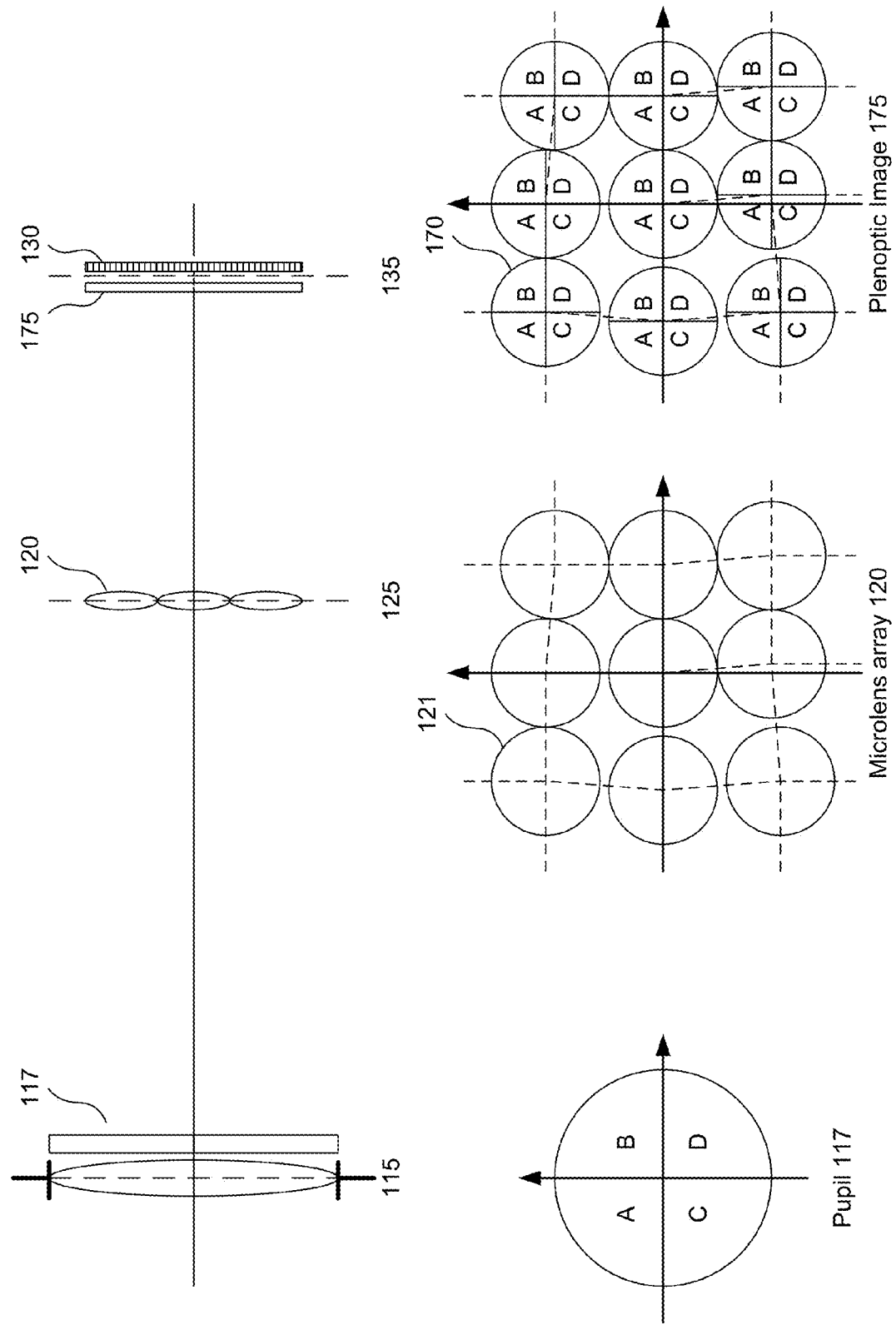
FIGS. 2B-2C are diagrams illustrating the effect of a misaligned micro-imaging array.

FIGS. 2A-2E illustrate different types of misalignments. FIG. 2A is a diagram illustrating plenoptic imaging when the pupil 117 and micro-imaging array 120 are perfectly aligned with the detector array 130. In this example, the pupil 117 is circular and divided into four regions A-D, for example a circular lens used in conjunction with a four-region filter module. The micro-imaging array 120 is a 3×3 array of microlenses 121. The micro-imaging array 120 is defined by the center of each microlens, in addition to the clear aperture for each microlens. The microlenses are perfectly aligned so that their centers lie on a square grid, as shown by the dashed lines. The resulting plenoptic image 175 is a 3×3 array of images 170 of the pupil (magnification and inversion are ignored for clarity). The center of each image 170 lies on a square grid determined by the square grid defining the centers of the microlenses. The thick x and y axes in FIG. 2A show the local coordinate systems as defined relative to the detector array. For the plenoptic image 175, the thick x and y axes show the position of the plenoptic image 175 relative to the detector array. The alignment of the plenoptic image 175 with the detector array 130 determines which detectors correspond to which superpixels and subpixels. In FIG. 2A, the plenoptic image 175 is perfectly aligned with the detector array. FIGS. 2B-2E illustrate different types of misalignments. In these figures, the thick x and y axes show the original aligned positions of the components.

Figure 2C:
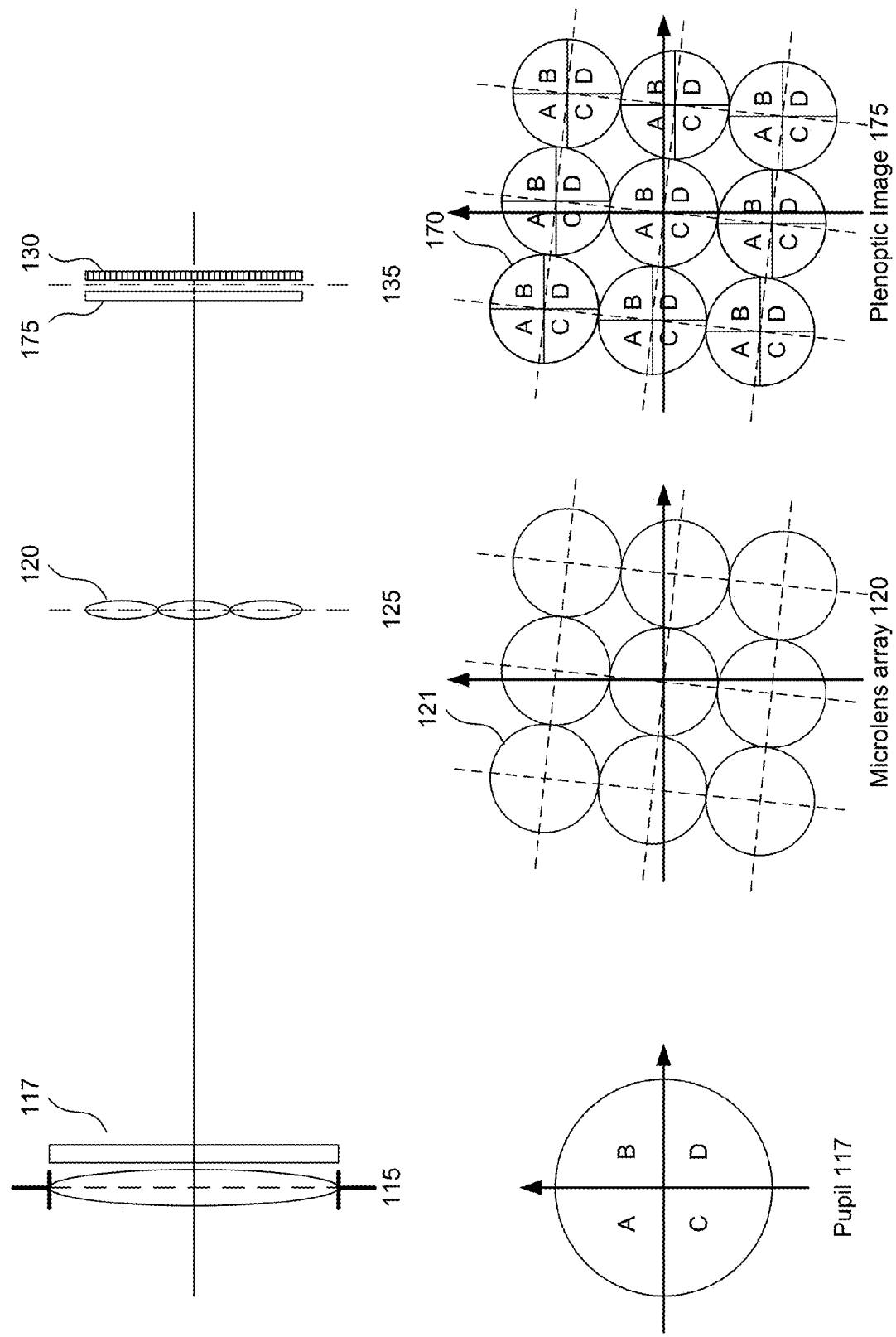

FIGS. 2B-2C are diagrams illustrating the effect of a misaligned micro-imaging array 120. In FIG. 2B, microlenses 121 are translated from their nominal positions. This may be due to a global effect, such as a translation of the entire array or a stretching or shrinking of the array as a whole. It may also be due to local effects, such as variation in the lens-to-lens spacing. Whatever the cause, the translations distort the perfect square grid of FIG. 2A. The new centers of the microlenses define a new grid. The changes in this grid result in corresponding changes in the grid defining the plenoptic image. The images 170 in the plenoptic image are translated to the centers defined by the new grid, as shown in the plenoptic image 175 of FIG. 2B.

In FIG. 2C, the microlens array 120 is rotated. This rotates the square grid that defines the location of each image 170 in the plenoptic image. However, each image 170 is not itself rotated (assuming that the microlenses themselves are rotationally symmetric). That is, each image 170 is translated to a new location due to the rotation of the underlying square grid. This is a special case of FIG. 2B, where the translation of each microlens is defined by an overall rotation of the array. FIGS. 2B-2C are just examples. Other types of microlens array misalignments are possible, for example tilt, rotation or shape variations in individual microlenses or in the microlens array.

Figure 2D:
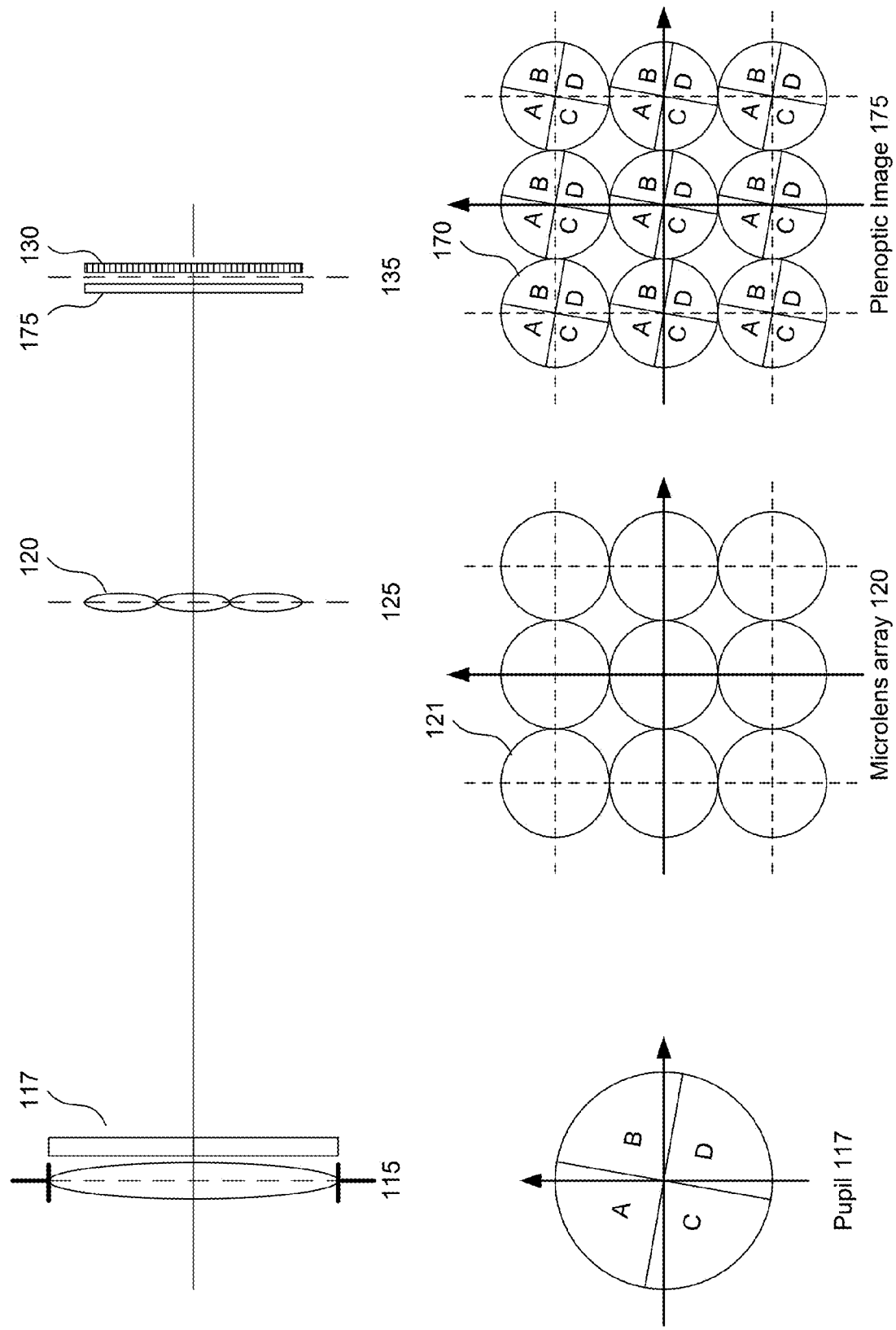
FIGS. 2D-2E are diagrams illustrating the effect of a misaligned pupil.
Figure 2E:
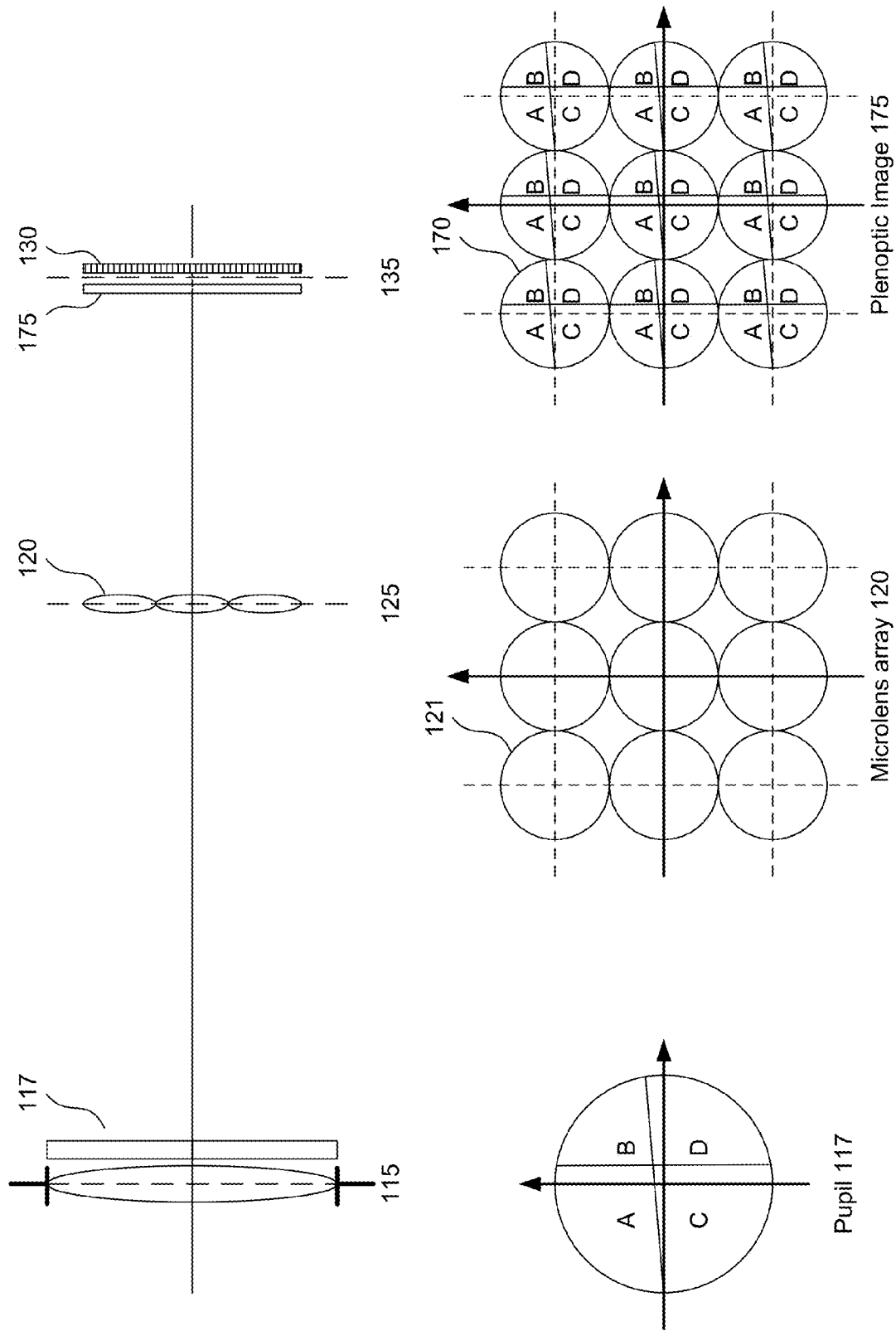

FIGS. 2D-2E are diagrams illustrating the effect of a misaligned pupil. Misalignments in the pupil are reflected in the images 170, because each image 170 is an image of the pupil. In FIG. 2D, the pupil is rotated. This results in a corresponding rotation of each image 170 in the plenoptic image, even though the location of each image 170 remains on the original square grid. In FIG. 2E, the individual filters within the filter module are slightly out of position, but the filter module is otherwise perfectly aligned with the detector array. This misalignment results in a corresponding change in each image 170.

Note that each of the misalignments in FIGS. 2B-2E change which detectors contribute to which superpixels and subpixels. In general, it is important to accurately map the detector array to the plenoptic image so that the plenoptic image can be processed with good results. In many situations, this mapping is preferably done through a calibration process.

FIG. 3 is a flow diagram of one method for calibrating a plenoptic imaging system. In this approach, a reference plenoptic image is captured 310 by the plenoptic imaging system. For example, the plenoptic imaging system might be uniformly illuminated. The captured plenoptic image is analyzed to determine 320 reference points for the superpixels in the plenoptic imaging system. These reference points are then used to determine 330 the locations of the superpixels relative to the detector array. This is preferably done on a superpixel-by-superpixel basis. That is, the location of each superpixel is determined and the superpixels are not required to fall on a regular grid. This approach can account for variations in lens-to-lens spacing, for example as shown in FIG. 2B. Examples of reference points include the centers of the superpixels and the corners of the superpixels.

Figure 5A:
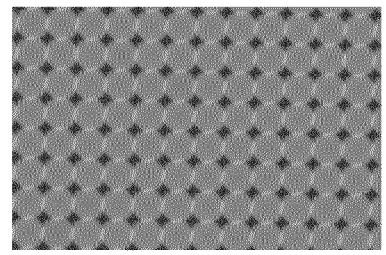
FIGS. 5A-5C illustrate the use of Otsu's method for binarizing a reference plenoptic image.
Figure 5B:
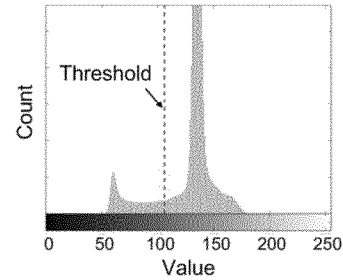
Figure 5C:
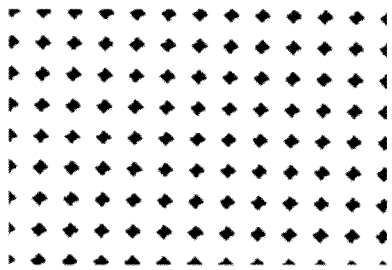

FIG. 4 shows a specific example of this approach. The superpixel is the image of the pupil 117 seen through each microlens 121 on the detector plane 135. To localize the centroid of each superpixel, a calibration image, in this case a plenoptic image of a white target, is first acquired 410. This reference image is used to localize 420 each superpixel. In this example, the captured reference image is converted 422 to a black and white binary image based on a threshold. The threshold can be determined by the user or can be determined automatically using algorithms such as Ostu's method. The binary image is used as a mask for further processing. An example of the result after thresholding using Otsu's method is shown in FIGS. 5A-5C. FIG. 5A shows the gray scale reference image. FIG. 5B shows the histogram of grayscale values and the threshold determined by Otsu's method. FIG. 5C shows the reference image after binarization, where white represents 1 and black represents 0. Note that the superpixels are merged together.

Figure 5D:
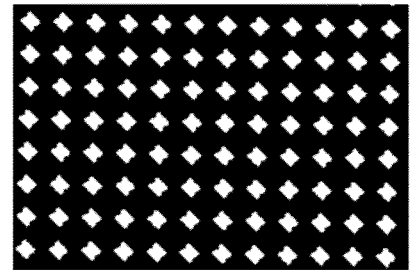
FIG. 5D illustrates the use of morphological filtering.

The superpixels can then be localized by applying different segmentation algorithms, such as morphological filtering. An example of using morphological filtering 424 is shown in FIG. 5D. In FIG. 5D, an erosion filter is first applied to the binary mask of FIG. 5C. This separates the different superpixels. Another method for extracting connected components that contain the centroids of superpixels is the watershed transform. This method can be applied to the reference image to extract connected components containing the centroids of the superpixels, and will separate connected superpixels due to fall-off in intensity toward the boundaries of the superpixels. After localization, the centroid of each superpixel is then estimated 426 for each local continuous region.

Another method for estimation of the centroid location is via Fourier transform analysis. In that case a Fourier transform of the sensor data is performed and peaks corresponding to the frequency of the lenslet pitch sampling are identified. From these identified lenslet pitch frequencies, a binary mask is created by first performing the Fourier transform of the pitch frequency coefficients, creating a grid pattern that is similar to the sensor data for a white target. This is then binarized so that center points are identified similarly to the method described above.

Figure 6:
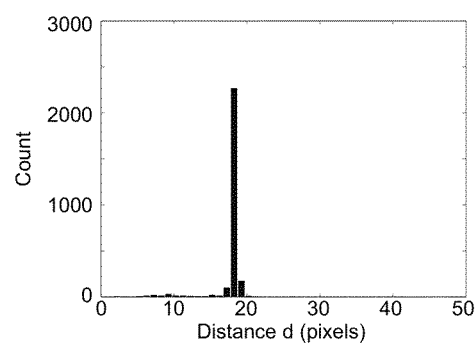
FIG. 6 is a histogram of calculated distances between microlenses.

After localizing 420 the superpixel centroids, various physical parameters related to the microlens array are calculated 430. A region of interest around the optical axis is first defined 432. The region around the optical axis is chosen because less distortion is present. For each of the extracted centroids within this region of interest, its four nearest neighbors are identified and the distances between them and the neighboring centroids are calculated. The diameter of the superpixel or the diameter of the circumscribing circle of a superpixel (in case of a non-circular aperture shape, e.g. hexagon aperture of filter partition) can then be estimated 434 based on the statistical distribution of the calculated distances. FIG. 6 shows a histogram of the calculated distances. In this example, the most common distance (18 pixels) is estimated as the diameter of the lenslets.

A centroid that has equal distances to its four neighboring centroids is then identified. The relative position between this centroid and its four neighbors is used to initially estimate 436 the rotation angle of the microlens array. Similar to the lenslet diameter estimation, the rotation angle can also be estimated based on the statistics of the angles calculated based on each centroid and its four nearest neighbors. The estimated rotation angle provides the rotated Cartesian coordinate system that is defined below $$\begin{bmatrix} x' \\ y' \end{bmatrix} = \begin{bmatrix} \cos\alpha & \sin\alpha \\ -\sin\alpha & \cos\alpha \end{bmatrix} \begin{bmatrix} x \\ y \end{bmatrix} \quad (1)$$

where α is the estimated rotation angle.

An alternative method to estimate the rotation angle is to estimate it from the peaks in the FFT domain. The nearest neighbor method described above can be applied to the location of the peaks corresponding to the lenslet pitch sampling in the FFT domain.

After the completion of these steps, the following parameters have been estimated:
  rotation angle α of microlens array relative to detector array. This defines a rotated (x',y') coordinate system relative to the original (x,y) coordinate system.
  estimated diameter of microlenses (all lenslets are assumed to be the same diameter in this example)
  locations of centers of each superpixel. These were originally estimated in the (x,y) coordinate system but can be transformed to the rotated (x',y') coordinate system according to equation (1).

Thus, each superpixel is defined by the location of its center, a generic lenslet diameter that applies to all superpixels, and the rotation angle α that defines the rotated (x',y') coordinate system. This is just one example. Other parameters can also be estimated. For example, the size and/or shape of each superpixel could be estimated separately for each individual superpixel.

One advantage of estimating locations for each (or most) superpixels is that superpixel-to-superpixel variations can be accounted for. Another advantage is that the approach is relatively insensitive to "dead sensor pixels," "dead lenslets" or other types of local defects. If one particular superpixel center cannot be determined or can be determined only with a fair amount of uncertainty, that largely does not affect the calibration of the other superpixels. In contrast, global approaches that extract the locations of only a few superpixels and then extrapolate the locations of the majority of superpixels based on those few samples are more susceptible to errors in the samples and also cannot account for superpixel-to-superpixel variations. Another advantage to the approach described above is that it is insensitive to tilt misalignments. If the microlens array is tilted relative to the detector array so that some microlenses are closer to the detectors than others, the approach described above can still be used to estimate the locations of the superpixels.

Sensor noise, sensor pixelation as well as other factors can lead to error in the parameter estimation, so in some cases the original superpixel estimate will be further refined 440. In one approach, both centroid location and rotation angle were estimated initially and are stored in a calibration profile. The initially estimated centroids are first projected onto the rotated coordinate. The centroid location and rotation angle can then be further refined 440 based on linear regression techniques, such as least-square estimation and maximum-likelihood estimation. A straight line is fitted for the centroids along each row and each column in the rotated (x',y') coordinate as defined by $$y' = \alpha + \beta x' \quad (2)$$

where the parameters a and fl are solved using minimization $$f(\alpha, \beta) = \mathrm{argmin}\ \{y_i - \alpha - \beta x_i\} \quad (3)$$

The centroid locations can be adjusted based on the fitted regression line. The refinement is performed iteratively until a stop criteria is met. The stop criteria could be a user defined number of iterations or a minimum difference between current and previous estimation results. This is just one example of a possible refinement process 440.

Figure 7A:
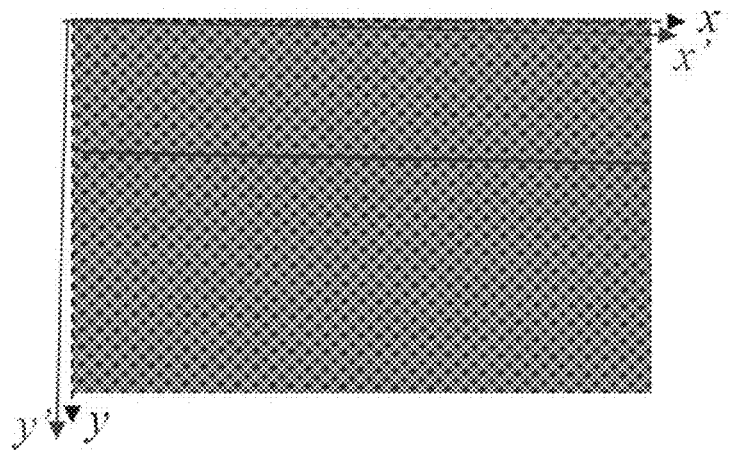
FIGS. 7A-7C illustrate refinement of estimation of centroid locations.
Figure 7B:
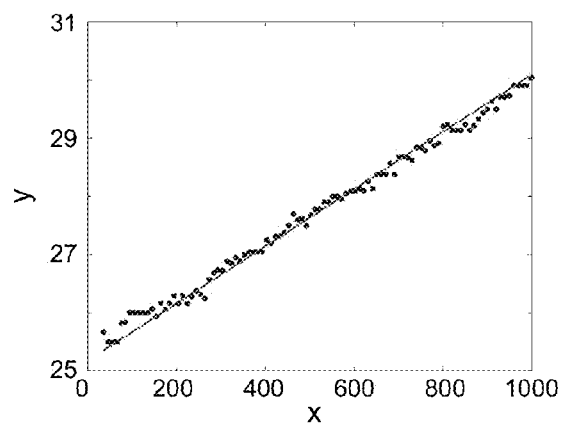
Figure 7C:
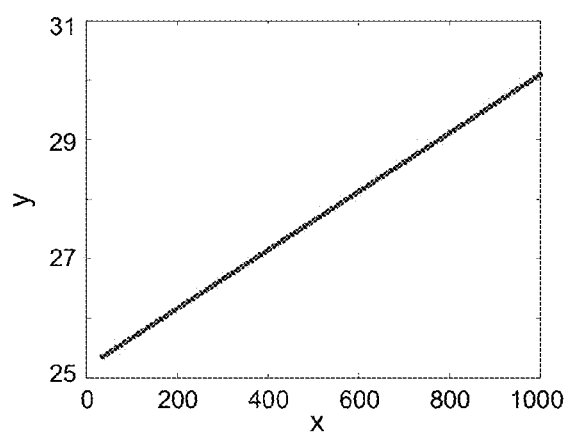

FIG. 7 shows an example of centroid refinement along one row. FIG. 7A shows the centroid location estimation before refinement, showing both the original (x,y) coordinate system and the rotated (x',y') coordinate system. FIG. 7B graphs the original estimates of the centroids, projected onto the original (x,y) coordinates. The line shown in FIG. 7B is the fitted line based on linear regression. FIG. 7C then graphs the centroid projection after refinement. In this example the least-square estimation is used to refine the estimation results. If distortions across the sensor area are significant, the refinement can be performed locally by dividing the whole image into several small regions.

In some cases, the parameter refinement can be performed by users "in the field." For example, plenoptic imaging systems may be designed to be modular. Different primary lenses can be attached and detached to a plenoptic back-end that contains a microlens array and detector array. Alternately, different combinations of primary imaging lens, micro-imaging arrays and detector arrays can be mixed and matched.

In some cases, the rotation angle is used as a predetermined parameter, and only centroid locations and the diameter of superpixel or the diameter of the circumscribing circle of a superpixel are recalculated. For example, the rotation angle may be initially calibrated during manufacture and stored in a calibration profile. Assume that the plenoptic imaging system is modular in that the primary imaging lens can be changed, but the micro-imaging array and detector array are an integral unit that stays together. When the primary imaging lens is changed, the user may recalibrate the superpixel locations, shapes and sizes, but using the rotation value from the calibration profile.

On the other hand, if the modular system includes a relay system between the microlens array and the detector array, permitting the interchange of different components, then rotational misalignment between the microlens array and the detector array can occur when the relay is mounted with the plenoptic sensor. In that case the rotation angle can also be recalculated each time a new relay-sensor combination is used.

Returning to FIG. 4, determining lenslet parameters effectively determines superpixel locations. After this, the primary lens pupil 117 is projected 450 onto the detector plane 135 based on the estimated centroid location, diameter of lenslet, and rotation angle of microlens array (i.e., based on estimated locations of the superpixels). This can be used to determine the footprint of the pupil as projected onto each superpixel, or to determine filter locations as projected onto each superpixel.

Figure 8:
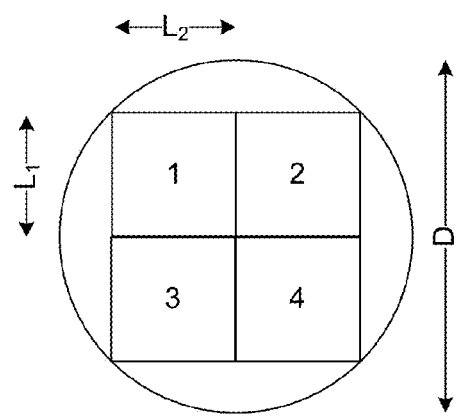
FIG. 8 is a diagram showing nomenclature for scaling of a filter module.

Different approaches can be used to project the pupil features onto the detector plane. One possible approach is based on geometric optics and the geometry of the aperture (including filters). As an example shown in FIG. 8, a filter array with 2×2 layout is placed in the pupil plane. Based on geometric optics the following relationship can be found for a plenoptic configuration:

$$\frac{1}{f} = \frac{1}{z_f} + \frac{1}{z_m} \quad (4)$$

where f is the focal length of lenslet, $z_f$ is the distance between the microlens array and a virtual image of the filter array generated by the exit pupil, and $z_m$ is the distance between the microlens array and the sensor plane. The magnification of the lenslet is $$M = \frac{z_m}{z_f} \quad (5)$$

The projection of filters onto the detector plane is then $$l_1 = M \times L_1 \quad (6)$$

$$l_2 = M \times L_2 \quad (7)$$

where l and $l_2$ are dimensions of the filter projected onto the detector plane, and $L_1$ and $L_2$ are dimensions of the filter in the pupil plane.

Another approach to project aperture features is by projecting a virtual circular aperture on the reference image captured with a non-circular aperture or with filters in the pupil plane. Some image processing algorithms can then be applied locally within each projected circular aperture to identify a region of interest to extract multi-view or multi-modality images.

In some cases, pupil misalignment (as shown in FIGS. 2D-2E) need not be calibrated, particularly since there is usually a significant demagnification of the pupil onto the plenoptic image. Where pupil misalignment is important, it can calibrated using different approaches. In one approach, the pupil (e.g., shape of clear aperture, geometry of the filter array within the pupil) is estimated based on direct measurement, and then the geometry of the pupil is projected onto each superpixel. Another approach is to correlate a filter pattern (or other pupil characteristics) with superpixel images and the geometry of the pupil is then estimated based on the correlation.

Although the detailed description contains many specifics, these should not be construed as limiting the scope of the invention but merely as illustrating different examples and aspects of the invention. It should be appreciated that the scope of the invention includes other embodiments not discussed in detail above.

For example, various types of optical modules can be used, including reflective and catadioptric systems. In some applications, the optical module is preferably telecentric. Finally, terms such as "light" and "optical" are not meant to be limited to the visible or purely optical regions of the electromagnetic spectrum, but are meant to also include regions such as the ultraviolet and infrared (but not be limited to these).

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A method for calibrating a plenoptic imaging system, the plenoptic imaging system including a detector array, the plenoptic imaging system subdividing the detector array into superpixels, the method comprising a processor executing the steps of:
   accessing a plenoptic image captured by the detector array of the plenoptic imaging system;
   analyzing the plenoptic image to determine reference points for the superpixels of the plenoptic imaging system; wherein the step of analyzing the plenoptic image comprises:
      binarizing the plenoptic image; and
      morphologically filtering the binarized plenoptic image; and
   from the reference points, determining a location of each superpixel relative to the detector array.

2. The method of claim 1 wherein the reference points for the superpixels are the centers of the superpixels.

3. The method of claim 1 wherein the superpixels are arranged in a rectangular array and the reference points for the superpixels are the corners of the elements in the rectangular array.

4. The method of claim 1 wherein the step of analyzing the plenoptic image comprises extracting centroids for the superpixels.

5. The method of claim 1 wherein the step of binarizing the plenoptic image uses an adaptive threshold for the binarizing.

6. The method of claim 1 wherein the superpixels are arranged in an array and the method further comprises the processor executing the step of analyzing the plenoptic image to determine an angle of rotation of the array relative to the detector array.

7. The method of claim 6 wherein the step of determining an angle of rotation comprises:
   taking a Fourier transform of the plenoptic image; and
   determining the angle of rotation from the Fourier transform.

8. The method of claim 1 further comprising the processor executing the step of:
   further refining the determined locations of the superpixels.

9. A method for calibrating a plenoptic imaging system, the plenoptic imaging system including a detector array, the plenoptic imaging system subdividing the detector array into superpixels, the method comprising a processor executing the steps of:
   accessing a plenoptic image captured by the detector array of the plenoptic imaging system;
   analyzing the plenoptic image to determine reference points for the superpixels of the plenoptic imaging system;
   from the reference points, determining a location of each superpixel relative to the detector array; and
   projecting a pupil of the plenoptic imaging system onto multiple locations of the detector array, based on the location of each superpixel relative to the detector array; wherein the pupil comprises a filter module with multiple filters, and the step of projecting the pupil onto multiple locations of the detector array comprises projecting the multiple filters onto multiple locations of the detector array.

10. The method of claim 1 further comprising the processor executing the step of:
   storing a calibration profile that corresponds to the determined locations of the superpixels relative to the detector array.

11. The method of claim 10 wherein the superpixels are arranged in an array and the calibration profile includes an angle of rotation of the array relative to the detector array.

12. The method of claim 9 wherein the reference points for the superpixels are the centers of the superpixels.

13. The method of claim 9 wherein the superpixels are arranged in a rectangular array and the reference points for the superpixels are the corners of the elements in the rectangular array.

14. The method of claim 9 wherein the step of analyzing the plenoptic image comprises extracting centroids for the superpixels.

15. The method of claim 9 wherein the step of analyzing the plenoptic image comprises:
   binarizing the plenoptic image; and
   morphologically filtering the binarized plenoptic image.

16. The method of claim 15 wherein the step of binarizing the plenoptic image uses an adaptive threshold for the binarizing.

17. The method of claim 9 wherein the superpixels are arranged in an array and the method further comprises the processor executing the step of analyzing the plenoptic image to determine an angle of rotation of the array relative to the detector array.

18. The method of claim 17 wherein the step of determining an angle of rotation comprises:
   taking a Fourier transform of the plenoptic image; and
   determining the angle of rotation from the Fourier transform.

19. The method of claim 9 further comprising the processor executing the step of:
   further refining the determined locations of the superpixels.

20. The method of claim 9 wherein the step of projecting the pupil onto multiple locations of the detector array comprises:
   calculating scaling factors for superpixels based on a spacing between superpixels; and scaling the pupil when projecting onto the detector array.

21. The method of claim 9 further comprising the processor executing the step of:
   storing a calibration profile that corresponds to the determined locations of the superpixels relative to the detector array.

22. The method of claim 21 wherein the superpixels are arranged in an array and the calibration profile includes an angle of rotation of the array relative to the detector array.

23. A method for calibrating a plenoptic imaging system, the plenoptic imaging system including a detector array, the plenoptic imaging system subdividing the detector array into superpixels, the method comprising a processor executing the steps of:
   accessing a plenoptic image captured by the detector array of the plenoptic imaging system;
   analyzing the plenoptic image to determine reference points for the superpixels of the plenoptic imaging system; and
   from the reference points, determining a location of each superpixel relative to the detector array; wherein the step of from the reference points determining a location of each superpixel comprises:
      accessing a calibration profile determined during manufacture of the plenoptic imaging system;
      estimating a location of each superpixel relative to the detector array, based on the calibration profile; and
      from the reference points, further refining the estimated locations of the superpixels.

24. The method of claim 23 wherein the reference points for the superpixels are the centers of the superpixels.

25. The method of claim 23 wherein the superpixels are arranged in a rectangular array and the reference points for the superpixels are the corners of the elements in the rectangular array.

26. The method of claim 23 wherein the step of analyzing the plenoptic image comprises extracting centroids for the superpixels.

27. The method of claim 23 wherein the step of analyzing the plenoptic image comprises:
   binarizing the plenoptic image; and
   morphologically filtering the binarized plenoptic image.

28. The method of claim 27 wherein the step of binarizing the plenoptic image uses an adaptive threshold for the binarizing.

29. The method of claim 23 wherein the superpixels are arranged in an array and the method further comprises the processor executing the step of analyzing the plenoptic image to determine an angle of rotation of the array relative to the detector array.

30. The method of claim 29 wherein the step of determining an angle of rotation comprises:
   taking a Fourier transform of the plenoptic image; and
   determining the angle of rotation from the Fourier transform.

31. The method of claim 23 further comprising the processor executing the step of: further refining the determined locations of the superpixels.

32. The method of claim 23 further comprising the processor executing the step of:
   projecting a pupil of the plenoptic imaging system onto multiple locations of the detector array, based on the location of each superpixel relative to the detector array.

33. The method of claim 32 wherein the pupil comprises a filter module with multiple filters, and the step of projecting the pupil onto multiple locations of the detector array comprises projecting the multiple filters onto multiple locations of the detector array.

34. The method of claim 32 wherein the step of projecting the pupil onto multiple locations of the detector array comprises:
   calculating scaling factors for superpixels based on a spacing between superpixels; and
   scaling the pupil when projecting onto the detector array.

35. The method of claim 23 wherein the superpixels are arranged in an array and the calibration profile includes an angle of rotation of the array relative to the detector array.

36. An auto-calibrating plenoptic imaging system comprising:
   an image-forming optical module characterized by a pupil plane and an image plane;
   an array of micro-imaging elements located at the image plane or a conjugate thereof;
   a detector array located at a conjugate of the pupil plane, the plenoptic imaging system subdividing the detector array into superpixels; and
   a processor coupled to the detector array, the processor executing the steps of:
      accessing a plenoptic image captured by the detector array of the plenoptic imaging system;
      analyzing the plenoptic image to determine reference points for the superpixels of the plenoptic imaging system; wherein the step of analyzing the plenoptic image comprises:
         binarizing the plenoptic image; and
         morphologically filtering the binarized plenoptic image; and
      from the reference points, determining a location of each superpixel relative to the detector array.

37. The plenoptic imaging system of claim 36 wherein the reference points for the superpixels are the centers of the superpixels.

38. The plenoptic imaging system of claim 36 wherein the superpixels are arranged in a rectangular array and the reference points for the superpixels are the corners of the elements in the rectangular array.

39. The plenoptic imaging system of claim 36 wherein the step of analyzing the plenoptic image comprises extracting centroids for the superpixels.

40. The plenoptic imaging system of claim 36 wherein the step of binarizing the plenoptic image uses an adaptive threshold for the binarizing.

41. The plenoptic imaging system of claim 36 wherein the superpixels are arranged in an array and the method further comprises the processor executing the step of analyzing the plenoptic image to determine an angle of rotation of the array relative to the detector array.

42. The plenoptic imaging system of claim 41 wherein the step of determining an angle of rotation comprises:
   taking a Fourier transform of the plenoptic image; and
   determining the angle of rotation from the Fourier transform.

43. The plenoptic imaging system of claim 36 further comprising the processor executing the step of:
   further refining the determined locations of the superpixels.

44. The plenoptic imaging system of claim 36 further comprising the processor executing the step of:
   storing a calibration profile that corresponds to the determined locations of the superpixels relative to the detector array.

45. The plenoptic imaging system of claim 44 wherein the superpixels are arranged in an array and the calibration profile includes an angle of rotation of the array relative to the detector array.

46. An auto-calibrating plenoptic imaging system comprising:
   an image-forming optical module characterized by a pupil plane and an image plane;
   an array of micro-imaging elements located at the image plane or a conjugate thereof;
   a detector array located at a conjugate of the pupil plane, the plenoptic imaging system subdividing the detector array into superpixels; and
   a processor coupled to the detector array, the processor executing the steps of:
      accessing a plenoptic image captured by the detector array of the plenoptic imaging system;
      analyzing the plenoptic image to determine reference points for the superpixels of the plenoptic imaging system;
      from the reference points, determining a location of each superpixel relative to the detector array; and
      projecting a pupil of the plenoptic imaging system onto multiple locations of the detector array, based on the location of each superpixel relative to the detector array; wherein the pupil comprises a filter module with multiple filters, and the step of projecting the pupil onto multiple locations of the detector array comprises projecting the multiple filters onto multiple locations of the detector array.

47. The plenoptic imaging system of claim 46 wherein the reference points for the superpixels are the centers of the superpixels.

48. The plenoptic imaging system of claim 46 wherein the superpixels are arranged in a rectangular array and the reference points for the superpixels are the corners of the elements in the rectangular array.

49. The plenoptic imaging system of claim 46 wherein the step of analyzing the plenoptic image comprises extracting centroids for the superpixels.

50. The plenoptic imaging system of claim 46 wherein the step of analyzing the plenoptic image comprises:
   binarizing the plenoptic image; and
   morphologically filtering the binarized plenoptic image.

51. The plenoptic imaging system of claim 50 wherein the step of binarizing the plenoptic image uses an adaptive threshold for the binarizing.

52. The plenoptic imaging system of claim 46 wherein the superpixels are arranged in an array and the method further comprises the processor executing the step of analyzing the plenoptic image to determine an angle of rotation of the array relative to the detector array.

53. The plenoptic imaging system of claim 52 wherein the step of determining an angle of rotation comprises:
   taking a Fourier transform of the plenoptic image; and
   determining the angle of rotation from the Fourier transform.

54. The plenoptic imaging system of claim 46 further comprising the processor executing the step of:
   further refining the determined locations of the superpixels.

55. The plenoptic imaging system of claim 46 wherein the step of projecting the pupil onto multiple locations of the detector array comprises:
   calculating scaling factors for superpixels based on a spacing between superpixels; and
   scaling the pupil when projecting onto the detector array.

56. The plenoptic imaging system of claim 46 further comprising the processor executing the step of:
   storing a calibration profile that corresponds to the determined locations of the superpixels relative to the detector array.

57. The plenoptic imaging system of claim 56 wherein the superpixels are arranged in an array and the calibration profile includes an angle of rotation of the array relative to the detector array.

58. An auto-calibrating plenoptic imaging system comprising:
   an image-forming optical module characterized by a pupil plane and an image plane;
   an array of micro-imaging elements located at the image plane or a conjugate thereof;
   a detector array located at a conjugate of the pupil plane, the plenoptic imaging system subdividing the detector array into superpixels; and
   a processor coupled to the detector array, the processor executing the steps of:
      accessing a plenoptic image captured by the detector array of the plenoptic imaging system;
      analyzing the plenoptic image to determine reference points for the superpixels of the plenoptic imaging system; and
      from the reference points, determining a location of each superpixel relative to the detector array; wherein the step of from the reference points determining a location of each superpixel comprises:
         accessing a calibration profile determined during manufacture of the plenoptic imaging system;
         estimating a location of each superpixel relative to the detector array, based on the calibration profile; and
         from the reference points, further refining the estimated locations of the superpixels.

59. The plenoptic imaging system of claim 58 wherein the reference points for the superpixels are the centers of the superpixels.

60. The plenoptic imaging system of claim 58 wherein the superpixels are arranged in a rectangular array and the reference points for the superpixels are the corners of the elements in the rectangular array.

61. The plenoptic imaging system of claim 58 wherein the step of analyzing the plenoptic image comprises extracting centroids for the superpixels.

62. The plenoptic imaging system of claim 58 wherein the step of analyzing the plenoptic image comprises:
   binarizing the plenoptic image; and
   morphologically filtering the binarized plenoptic image.

63. The plenoptic imaging system of claim 62 wherein the step of binarizing the plenoptic image uses an adaptive threshold for the binarizing.

64. The plenoptic imaging system of claim 58 wherein the superpixels are arranged in an array and the method further comprises the processor executing the step of analyzing the plenoptic image to determine an angle of rotation of the array relative to the detector array.

65. The plenoptic imaging system of claim 64 wherein the step of determining an angle of rotation comprises:
   taking a Fourier transform of the plenoptic image; and
   determining the angle of rotation from the Fourier transform.

66. The plenoptic imaging system of claim 58 further comprising the processor executing the step of:
   further refining the determined locations of the superpixels.

67. The plenoptic imaging system of claim 58 further comprising the processor executing the step of:
  projecting a pupil of the plenoptic imaging system onto multiple locations of the detector array, based on the location of each superpixel relative to the detector array.

68. The plenoptic imaging system of claim 67 wherein the pupil comprises a filter module with multiple filters, and the step of projecting the pupil onto multiple locations of the detector array comprises projecting the multiple filters onto multiple locations of the detector array.

69. The plenoptic imaging system of claim 67 wherein the step of projecting the pupil onto multiple locations of the detector array comprises:
  calculating scaling factors for superpixels based on a spacing between superpixels; and
  scaling the pupil when projecting onto the detector array.

70. The plenoptic imaging system of claim 58 wherein the superpixels are arranged in an array and the calibration profile includes an angle of rotation of the array relative to the detector array.

* * * * *